United States Patent [19]

Debloois et al.

[11] 3,866,133

[45] Feb. 11, 1975

[54] DIGITAL FREQUENCY-PHASE DISCRIMINATOR CIRCUIT

[75] Inventors: Roger C. Debloois, West Lake Village, Calif.; Noel E. Hogue, Cedar Rapids, Iowa

[73] Assignee: Rockwell International Corporation

[22] Filed: Mar. 7, 1974

[21] Appl. No.: 448,854

[52] U.S. Cl. ................. 329/104, 328/134, 328/151, 307/233

[51] Int. Cl. ........................... H03k 9/00, H03k 5/20

[58] Field of Search ............ 329/104, 122; 307/112, 307/233; 328/133, 134, 151; 325/320, 346; 331/23, 25

[56] References Cited

UNITED STATES PATENTS

| | | | |
|---|---|---|---|
| 3,431,509 | 3/1969 | Andrea | 331/25 |
| 3,559,083 | 1/1971 | Crouse | 329/104 |
| 3,602,828 | 8/1971 | Kurzweil et al. | 329/104 |
| 3,755,746 | 8/1973 | Hogue et al. | 328/134 X |
| 3,801,918 | 4/1974 | Milne et al. | 329/104 |

*Primary Examiner*—Alfred L. Brody

*Attorney, Agent, or Firm*—Howard R. Greenberg

[57] ABSTRACT

The output of a digital frequency-phase discriminator is applied to a sample and hold circuit via a ramp signal generator to provide a smooth DC output which is indicative of the frequency and phase angle differences between two similar periodic signals.

2 Claims, 2 Drawing Figures

PATENTED FEB 11 1975 3,866,133

SHEET 1 OF 2

FIG. I

DIGITAL FREQUENCY-PHASE DISCRIMINATOR CIRCUIT

BACKGROUND OF THE INVENTION

The present invention pertains to digital frequency-phase discriminator circuits generally and in particular to such discriminator circuits as are used for phase-locked loop operation.

Digital frequency-phase discriminators are used to compare a given periodic signal with some like reference signal, normally providing two DC level outputs; one level which is continuous when the frequency of the given signal exceeds that of the reference signal and the other level which is also continuous when the frequency of the given signal is less than that of the reference signal and alternations between the two levels when the frequencies are identical with the duty cycle (duration of each signal level) being a function of the phase angle difference between the periodic signals. These discriminators find their greatest use in discriminator circuits for phase-locked loop operation wherein the discriminator output is applied to a low-pass filter to obtain a phase related DC voltage whose magnitude controls the frequency of a voltage controlled oscillator the output of which is the source of the given signal. In a phase-locked loop circuit the frequency of the given signal is varied until it matches that of the reference signal. This is all described in great detail in a U.S. Pat. (No. 3,431,509) entitled "Phase-Locked Loop with Digitalized Frequency and Phase Discriminator" which issued to J. J. Andrea and is assigned to the assignee of the present invention.

The discriminator circuit just described has major disadvantages in that the required low-pass filter employs bulky and expensive inductive and capacitive elements, thus partially vitiating the space and cost savings possible with digital circuitry and further exhibits a limited bandwidth of operation with respect to the reference frequency; viz. the frequency of the given signal must be within 10% of the frequency of the reference signal initially in order to avoid stability problems. Also, the output of the discriminator itself contains undesirable spikes which can produce harmful results if not properly filtered out by the low-pass filter.

With the foregoing in mind, it is a primary object of the present invention to provide a new and improved digital frequency-phase discriminator circuit.

It is a further object of the present invention to provide a new and improved digital frequency-phase discriminator circuit which is cheaper and smaller than prior art devices.

It is still a further object of the present invention to provide a new and improved frequency phase-discriminator which eliminates undesirable spikes in its output and affords a greater bandwidth for phase-locked loop operation than previously attainable within stability limitations.

BRIEF DESCRIPTION OF THE INVENTION

The invention includes a digital frequency-phase discriminator which provides one digital control signal when the frequency of a reference periodic signal is greater than that of a variable periodic signal, a second digital control signal when the frequency of the reference signal is less than that of the variable signal and alternations between the two control signals when the frequencies are identical and there is a phase angle difference between the two signals, with the duty cycle being determined by the magnitude of the phase angle difference. The output of the discriminator is connected to a ramp signal generator whose output varies linearly between two fixed levels until the greater level is attained, if so permitted by a 100% duty cycle during the presence of one of the control signals and which is always maintained at the lower of the two levels in the presence of the other control signal. A sample and hold circuit is provided for periodically sampling the output of the ramp signal generator and for holding the sampled value until the next sample is taken. Thus, when the frequencies of the periodic signals are different, the output of the sample and hold circuit is at the same level as one or the other of the two fixed levels generated at the output of the ramp signal generator, the level being dependent on which of the frequencies is the greater and when the frequencies are equal, its output lies somewhere in between the two fixed levels as a linear function of the phase angle difference between the periodic signals.

DETAILED DESCRIPTION OF THE DRAWINGS

Figure 1:
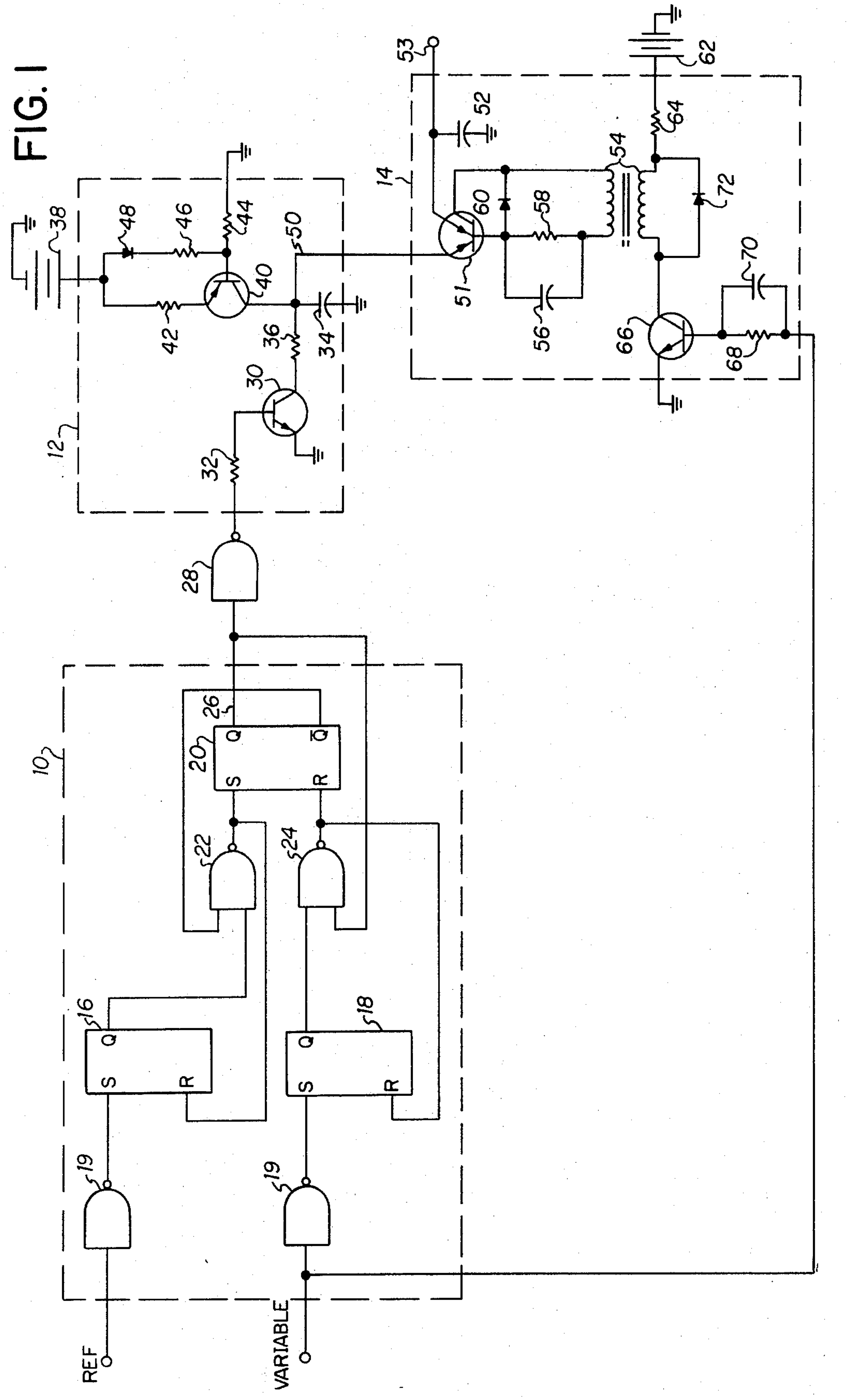

FIG. 1 is a schematic drawing of the preferred embodiment of the invention.

Figure 2:
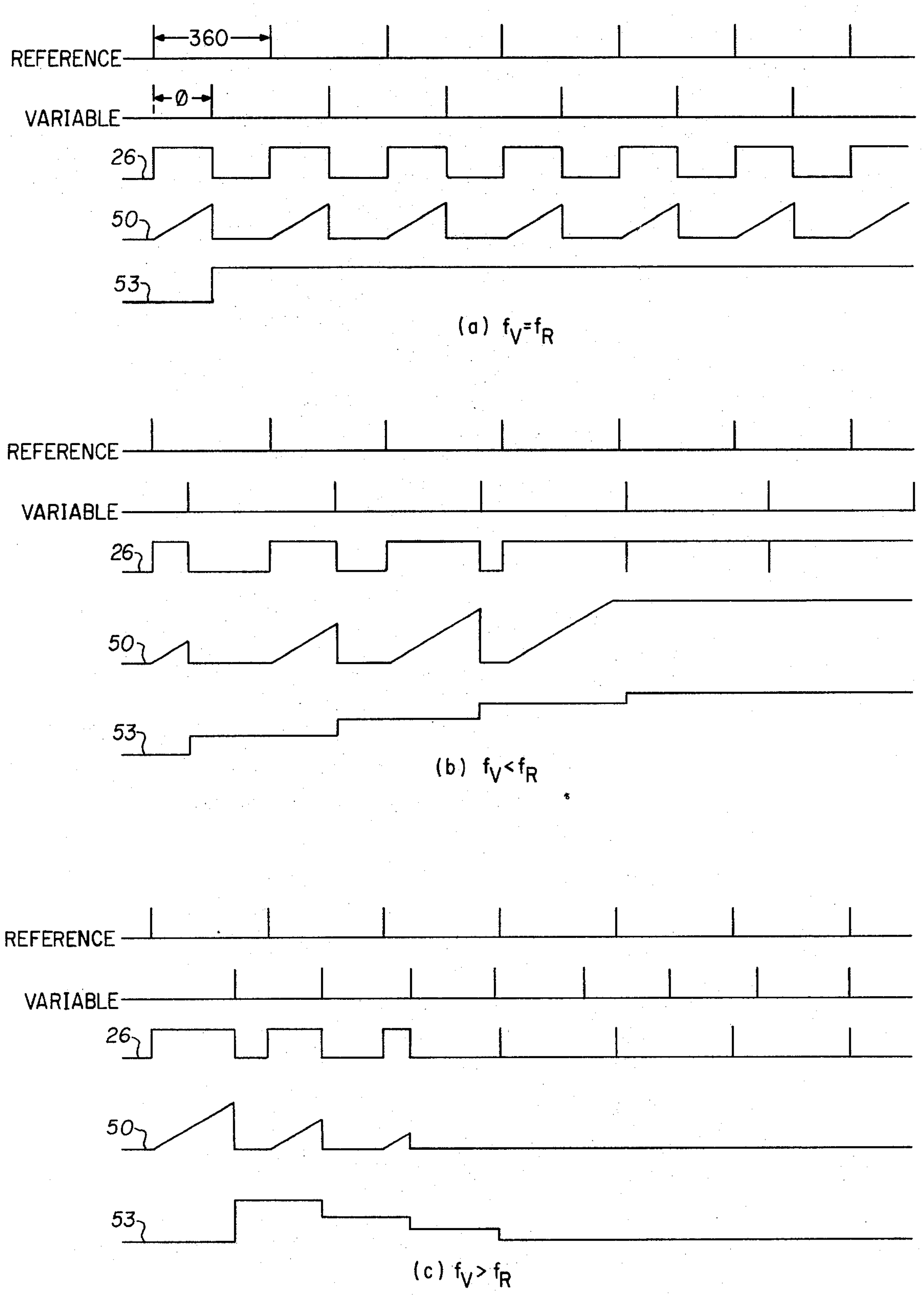

FIG. 2 provides a set of waveforms for the signals at various points of the circuit of FIG. 1 which will be found helpful in understanding the invention.

DETAILED DESCRIPTION OF THE INVENTION

As shown in FIG. 1, the invention comprises a digital frequency-phase discriminator 10, a ramp signal generator 12 and a sample and hold circuit 14, each of which will be discussed in detail in conjunction with the waveforms shown in FIG. 2.

The frequency-phase discriminator 10 includes three R-S flip-flops, each of which is set (Q output high corresponding to a logic "one" level) from a reset state (Q output low corresponding to a logic "zero" level) by the momentary application of a low signal such as ground, to its S input lead and is reset by the momentary application of a low signal to its R input lead. The S inputs of flip-flops 16 and 18 are connected through inverters 19 to sources of a reference and variable periodic signal, respectively, which have the same wave shape such as shown by the first two waveforms of FIG. 2. It should be pointed out that the impulse type waveforms which are shown, are depicted herein only by way of illustration, since the frequency-phase discriminator 10 can operate with any bi-level periodic signal (using the appropriate type of flip-flops, of course, for compatibility purposes) and consequently with any periodic signal, merely by converting it to a bi-level signal such as through the use of a Schmitt trigger circuit. The Q outputs of flip-flops 16 and 18 are connected respectively to the S and R inputs of a flip-flop 20 through respective NAND gates 22 and 24. A second input to NAND gate 22 is derived from the $\overline{Q}$ output of flip-flop 20 while its Q output provides a second input to NAND gate 24. The outputs of NAND gates 22 and 24 are also connected respectively to the R inputs of flip-flops 16 and 18.

In describing the operation of the frequency-phase discriminator 10, let us assume that initially all three of its flip-flops are in the reset state and further that the frequency of the reference and variable signals ($f_R$ and $f_V$, respectively) are equal as represented in FIG. 2A.

At this point, it should be noted that the term variable is applied to one of the signals only for distinguishing purposes since that signal may or may not vary dependent upon the use to which the invention is put. For example, if the invention is used in a phase-locked loop circuit, then the frequency of the variable signal, if different from the reference signal will indeed vary until it matches the reference signal as is fully explained in the aforementioned Andrea patent. However, as will become apparent hereinafter, the invention could be used with a variable signal whose frequency for any given situation is fixed, and for simplicity of explanation this mode of operation will be assumed during the course of the description.

The first impulse of the reference signal sets flip-flop 16 whose high Q output together with the high $\overline{Q}$ output of flip-flop 20 produces a low at the output of NAND gate 22, thereby setting flip-flop 20 and immediately resetting flip-flop 16. The resetting of flip-flop 16 returns its Q output to a low thereby partially disabling NAND gate 22 and returning its output to a high. The Q output of flip-flop 20, designated as 26 in FIG. 2, remains high until the first impulse of the variable signal is applied to flip-flop 18 (via inverter 19). At that time flip-flop 18 is set so that its high Q output, together with the high Q output now present for flip-flop 20, produces a low at the output of NAND gate 24 thereby resetting flip-flop 20 as well as flip-flop 18. The Q output 26 of flip-flop 20 returns to its low state and remains there until the next reference signal impulse is applied to flip-flop 16. As is apparent from the foregoing description, flip-flop 20 will be alternately set and reset by the reference and variable signal impulses respectively so long as their frequencies are equal. It will be noted that the length of time during which flip-flop 20 is set, hereinafter referred to as the duty cycle, is controlled solely by the phase angle $\phi$ of the variable signal with respect to that of the reference signal so that if 360° corresponds to the period between reference impulses, flip-flop 20 is never set when the phase angle is 0° and is always set when the phase angle is 360°. In between these two limits the set period for flip-flop 20 or duty cycle, is a linear function of the phase angle difference between the periodic signals which may be used for phase discrimination.

Let us now look at the case when the variable signal frequency $f_V$ is not equal to but rather is less than the reference signal frequency $f_R$ which is depicted by FIG. 2B. Once again assuming that all three flip-flops of the frequency-phase discriminator 10 are in the reset state initially, the first reference signal impulse sets flip-flop 16 which in turn also sets flip-flop 20 as before. As before, flip-flop 20 is reset by the first impulse of the variable signal. Since the frequency of the variable signal is now less than that of the reference signal as illustrated in FIG. 2B, the period of time during which flip-flop 20 is set becomes consecutively greater since the separation between each reference and variable signal impulse which immediately follows and which determines the set period becomes greater. A point is finally reached where a reference signal impulse is not followed immediately by a variable signal impulse as was the case when the periodic signal frequencies were equal, but rather is followed by another reference signal impulse (impulses 4 and 5 of FIG. 2B). Since the fourth impulse of the reference signal was not followed immediately by an impulse of the variable signal, flip-flop 20 is already in the set state when the fifth impulse of the reference signal is applied to flip-flop 16 so that no change occurs at the output of the frequency phase discriminator 10 at this time even though flip-flop 16 is set. Also, since the $\overline{Q}$ output of flip-flop 20 is low at this time NAND gate 22 is partially disabled so that its output remains high and flip-flop 16 is not reset immediately after having been set as before. The Q output of flip-flop 16 therefore remains high.

When the fourth impulse of the variable signal is received (following the fifth impulse of the reference signal, flip-flop 18 is set which in turn causes flip-flop 20 to be reset as before. However, since flip-flop 16 is set at this time, its high Q output combines with the high $\overline{Q}$ output of flip-flop 20 to fully enable NAND gate 22 thereby immediately returning flip-flop 20 to its set state and flip-flop 16 to its reset state. Each reference signal impulse thereafter merely sets flip-flop 16, the operation of which can have no effect on the already set flip-flop 20. The application of each impulse of the variable signal to flip-flop 18 thereafter sets flip-flop 18 and resets flip-flop 20; the reset period of flip-flop 20 is only momentary however, because flip-flop 20 is immediately set as a result of the set state of flip-flop 16. So long as the frequency of the variable signal is less than that of the reference signal this mode of operation will continue wherein the output 26 of the frequency-phase discriminator 10 remains high with spikes superimposed thereon coincident with the variable signal impulses.

Let us now consider the situation when the frequency of the variable signal $f_V$ exceeds that of the reference signal $f_R$ as shown in FIG. 2C. The operation of the frequency-phase discriminator 10 for the first three impulses is the same as described before for the case when the signal frequencies are the same, except for the consecutive shortening of the period during which flip-flop 20 is set because of the consecutively decreasing separations between each reference and immediately following variable signal impulse as a result of the relative signal frequencies. Since the third impulse of the variable signal is followed by another impulse thereof rather than a reference signal impulse, flip-flop 18 is still in the set state rather than the reset state when the next reference signal impulse (number 4) is received. This is so because following the fourth variable signal impulse, flip-flop 20 is in the reset state not having been set by a reference signal impulse after the third variable signal impulse, and therefore producing a low at its Q output 26 which partially disables NAND gate 24, thereby preventing flip-flop 18 from being reset. Consequently, although flip-flop 20 is set by the setting of flip-flop 16 upon receipt of the fourth reference signal impulse, it is immediately reset thereafter since the high Q output of flip-flop 20 combines with the high Q output of flip-flop 18 to produce a low at the output of NAND gate 24. Although each variable signal impulse thereafter sets flip-flop 18, it has no effect on the already reset flip-flop 20. Although the application of each impulse of the reference signal to flip-flop 16 thereafter does set flip-flop 16 as well as flip-flop 20, the set period of flip-flop 20 is only momentary because flip-flop 20 is immediately reset as a result of the set state of flip-flop 18. So long as the frequency of the variable signal is greater than that of the reference signal this mode of operation will persist wherein the Q output 26 of flip-flop 20 and consequently the frequency-phase discriminator 10 remains low with spikes which aare coincident with the reference signal impulses.

It is thus seen that the output of the frequency-phase discriminator 10 is a continuous high signal with spikes when the variable signal frequency $f_V$ is less than the reference signal frequency $f_R$, a continuous low signal with spikes when the variable signal frequency $f_V$ is greater than the reference signal frequency $f_R$ and alternates between the high and low signals when the periodic signals have the same frequency but different phase angles with the duty cycle being a function of the phase angle between the two periodic signals.

The output of the frequency-phase discriminator 10 is applied to the ramp signal generator 12 through an inverter 28. The ramp signal generator 12 includes a transistor 30 which has its base connected to the output of inverter 28 through a resistor 32, its emitter connected to ground and its collector connected to a capacitor 34 through a resistor 36. The output of the ramp signal generator 12 is taken across the capacitor 34 with respect to ground. The capacitor 34 is connected to a power supply 38 via the emitter-collector path of a transistor 40 and a resistor 42. The base of transistor 40 is connected to ground via a resistor 44 as well as to the power supply 38 through a resistor 46 and diode 48.

When transistor 30 is cut off by the application of a high signal to the input of inverter 28 (flip-flop 20 set), capacitor 34 is enabled to be charged from the power supply 38 through the collector-emitter path of transistor 40 which is in series with resistor 42. Transistor 40 in combination with resistors 42, 44, 46 and diode 48 act as a constant current source so that the voltage appearing across capacitor 34 varies linearly, as it is charged for more accurate results. The capacitor 34 will continue to charge up to the voltage of the DC power supply 38 unless prevented from doing so by the conduction of transistor 30. When transistor 30 is turned on by the application of a low signal to the input of inverter 28 (flip-flop 20 reset), its collector-emitter path provides a low impedance path via resistor 36 for rapidly discharging capacitor 34. Thus, when transistor 30 is conductive the voltage across capacitor 34 is effectively zero (resistor 36 being much smaller than resistor 42) and when it is cut off the voltage across capacitor 34 changes linearly to an ultimate value equal to the DC power supply 38 potential if not prematurely discharged. The period of time that it takes for the voltage across the capacitor 34 to go from zero to the potential of the DC power supply 38 is the same as the period of the reference signal.

Referring to waveform 50 which represents the voltage across capacitor 34 and therefore the output of the ramp signal generator 12, it is seen in FIG. 2A that when the frequency of the variable signal is the same as that of the reference signal, the generation of the ramp signal begins with each reference impulse and terminates with each variable impulse in the presence of the high Q output of the frequency-phase discriminator 10 which is the duty cycle. If the high Q output of flip-flop 20 is considered to be a digital control signal which enables the ramp signal generator 12 to generate a linear (ramp) signal, then the maximum level for the output signal 50 is a linear function of the phase angle between the periodic signals as determined by the duty cycle when the enable control signal is present. With 0° phase difference the output 50 would be zero, while at 360° the output 50 would be equal to the potential of the DC power supply 38. In between, the output 50 is a recurrent ramp signal.

When the frequency of the reference signal is greater than that of the variable signal (FIG. 2B), then the enable control signal for generating a ramp signal has a continually increasing duty cycle (in accordance with the set period of flip-flop 20) which eventually exceeds the period of the reference signal after which the enable control signal is continuous except for the presence of spikes. This maintains the transistor 30 cut off, thereby permitting the capacitor 34 to charge to the potential of DC power supply 38.

When the frequency of the variable signal exceeds that of the reference signal (FIG. 2C), then the enable control signal has a continually decreasing duty cycle which eventually attains a continuous value of zero except for the presence of spikes. In this case, transistor 30 is rendered continuously conductive so that capacitor 34 is unable to be charged and therefore its output voltage is zero. The spikes which are present in the output of the frequency-phase discriminator 10 for differing signal frequencies has no effect on the ramp generator 12 since they are too fast to produce any change in voltage across the capacitor 34. It will be noted that when the output of the ramp signal generator 12 is continuously equal to either of the two fixed levels between which the ramp signal is generated, a problem occurs when the frequency of the variable signal is fixed since it is not determinable whether the constant output represents a difference in frequency between the periodic signals or a phase angle of 0° or 360°between periodic signals having the same frequency, whichever is applicable (e.g. a constant low being indicative of either a phase angle of 0°between signals having the same frequency or a reference signal frequency which is greater than the variable signal frequency). Thus, when the variable signal frequency is fixed the invention cannot be used for phase discrimination right around 0°and 360°unless it is known that the frequency of the variable signal is the same as that of the reference signal. When used in a phase-locked loop circuit the foregoing problem does not arise, since the output of the frequency-phase discriminator 10 is such as to always drive the voltage controlled oscillator source of the variable signal to a frequency which matches that of the reference signal.

To provide a smooth DC output for the phase-discrimination mode (variable and reference signal frequencies equal) as well as for the frequency discrimination mode, the output of the ramp signal generator 12 is applied to the sample and hold circuit 14 through a dual-emitter transistor 51 which has well known characteristics for passing current between its two emitters in either direction. One of its emitters is connected to the capacitor 34 while the other emitter is connected to a hold capacitor 52 across which the output 53 of the sample and hold circuit 14 is taken with respect to ground. The base and collector of transistor 51 are connected together through the secondary winding of a pulse transformer 54 via a capacitor 56 in parallel with a resistor 58 as well as a diode 60, the last three elements being provided for pulse shaping purposes. The primary winding of transformer 54 is connected between ground and a grounded power supply 62 through a resistor 64 and the collector emitter path of a transistor 66 whose base is connected to the variable signal source through a resistor 68 connected in parallel with a capacitor 70. The last two elements together with a diode 72 which is connected across the primary winding of transformer 54 are provided for pulse shaping purposes.

Each time an impulse occurs in the variable signal, it momentarily renders transistor 66 conductive permitting current to pass through the primary winding of transformer 54 so that the transformer coupling action provided in the secondary winding of transformer 54 momentarily forward biases transistor 51. At that point whatever voltage is present on capacitor 34 is reproduced across hold capacitor 52 with current flow through the dual-emitters of transistor 50 being in whichever direction the relative capacitor voltages requires. At the end of the variable signal impulse, transistor 66 is disabled which in turn disables transistor 51 causing the hold capacitor 52 to hold the sampled voltage until the next sample is taken when the next variable signal impulse occurs. The sampling command signal in the particular embodiment described herein is taken from the variable signal as a matter of convenience only, since it is readily apparent that by using appropriate circuitry it could be taken just as well as from the reference signal or the output of the frequency-phase discriminator 10 so long as it is made to occur at the termination of each ramp signal coincident with the end of the duty cycle when the enable control signal is present. When used in a phase-locked loop circuit the output 53 of the sample and hold circuit 14 would be connected to the input of a voltage controlled oscillator whose output would directly or indirectly via a frequency divider circuit provide the variable signal to the frequency-phase discriminator 10.

The discriminator circuit described herein is thus seen to provide a smooth DC output removed of spikes for both the phase and frequency discriminator mode without the use of a low-pass filter, thereby eliminating the need for bulky and expensive inductive and capacitive elements. Further, the exhibited bandwidth for phase-locked loop operation without exceeding stability limitations permits variable frequencies which can differ from the reference frequency by as much as 50 percent, a five times increase over the 10 percent that was previously attainable in the prior art, thereby affording much greater flexibility of utilization. Since various modifications to the preferred emobdiment are possible without departing from the scope and spirit of the invention, the foregoing detailed description is intended to be merely exemplary and not restrictive of the invention as is claimed hereinbelow.

What is claimed is:

1. A digital frequency-phase discriminator circuit for comparing a variable periodic signal with a reference periodic signal, comprising:

discriminator means for providing one digital control signal when the frequency of the variable signal is less than that of the reference signal, another digital control signal when the variable signal frequency is greater than the reference signal frequency and alternations between the two control signals when the periodic signals have the same frequency but different phase angles with the duty cycle in such case being a linear function of the phase angle between the periodic signals;

ramp generator means having an output between two fixed levels wherein the output is maintained at one level in response to one of the control signals and is enabled to linearly change to the other level in response to the other control signal, the other level being attained in a time period corresponding to the period of the reference signal; and sample and hold circuit means for periodically sampling the output of said ramp signal generator means and holding the sampled value until the next sample is taken.

2. The discriminator circuit of claim 1 wherein the output of said ramp generator means is sampled at the end of the duty cycle when the enable control signal is present for periodic signals having equal frequencies.

* * * * *